Oct. 26, 1965  J. C. THORNTON  3,214,065
POWDER DISPENSING DEVICES
Filed Sept. 4, 1963
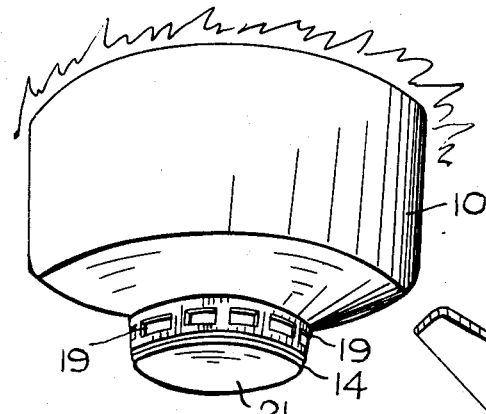
FIG. 1.
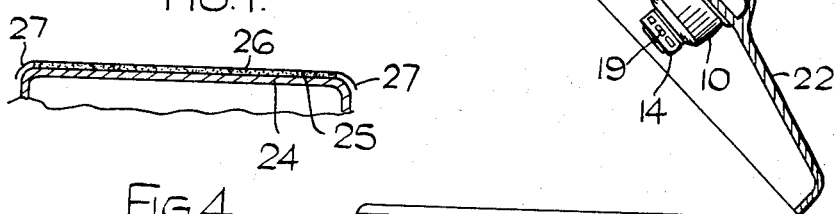
FIG. 4.  FIG. 2.
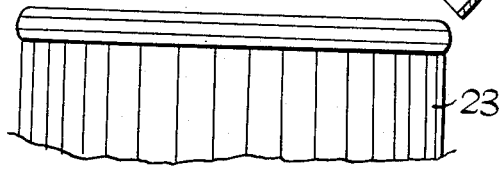
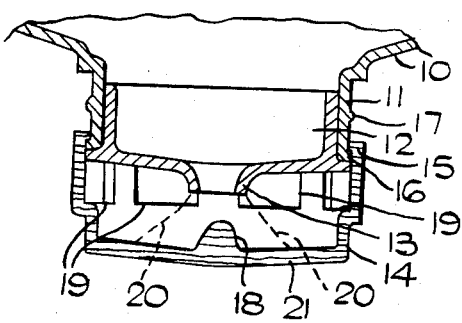
FIG. 3.
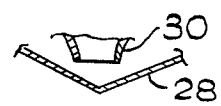
FIG. 5.
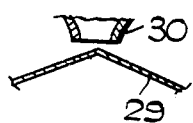
FIG. 6.
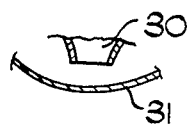
FIG. 7.
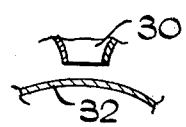
FIG. 8.
INVENTOR
JAMES COWARD THORNTON
By Linton and Linton, ATTORNEYS

United States Patent Office 3,214,065
Patented Oct. 26, 1965

3,214,065
POWDER DISPENSING DEVICES
James Coward Thornton, Mountsorrel, Loughborough, England, assignor to J. Goddard & Sons Limited
Filed Sept. 4, 1963, Ser. No. 306,548
3 Claims. (Cl. 222—166)

This invention is for improvements in or relating to powder dispensing devices and has for one of its objects to provide a convenient and effective package from which powdered disinfectant and/or deodorising material can be dispensed in a required manner.

In accordance with the invention there is provided a container for powdered disinfecting and/or deodorising material having a neck portion provided with dispensing means whereby powder from the container is allowed to escape and become sprinkled when the container is in inverted attitude and is subjected to mechanical disturbance, and means for attaching the container in inverted attitude to the underside of a lid of a garbage or like receptacle. The dispensing means is conveniently so arranged that the powdered material is allowed to collect adjacent to the outlet of the neck and clog the outlet so as to prevent continued discharge. Thus, when the lid of the receptacle is lifted to obtain access to the interior of the receptacle, the mechanical disturbance of the lid is arranged to cause the powder accumulated against the neck outlet of the inverted container to become sprinkled on to the contents of the receptacle. Further powder is then automatically dispensed until the outlet again becomes clogged as it does when the lid is replaced on the receptacle.

A dispensing container of the kind referred to can be used to ensure freedom from infection and/or offensive smells without requiring any attention on the part of the user, as once attached to the lid of a garbage or similar receptacle it will continue to function as a sprinkler whenever the lid is moved until the powder is exhausted from the container. Thereupon it is merely necessary to substitute a further container in place of the empty one.

In a convenient arrangement the means for attaching the container in inverted attitude to the inside of a lid is by means of tacky adhesive on the under face of the container which before use is covered by a protective layer such as a layer of silicone impregnated paper. Other means of attachment of the container to the lid may however be employed, for example suction pads.

The dispensing means for release of powder from the container may take various forms and conveniently is combined with closure means for sealing the container before use. The arrangement may be such that movement of a sealing cover from a closed position brings the dispensing means into operation for use when the container is inverted.

In general it is contemplated that the dispensing device will be provided by a cap associated with a relatively small discharge outlet which may be provided in a plug arranged to fit into the neck of the container. This cap when moved away from the orifice of the discharge outlet to a predetermined extent fixed by means preventing complete detachment of the cap from the plug, provides a ledge on to which powder can gravitate through the orifice into a heap which heap when clogs further discharge from the orifice until mechanical disturbance has occurred.

The foregoing and other provisions of the invention are incorporated in a convenient form of construction and certain modifications which are illustrated by way of example in the accompanying drawings and will now be described with reference to the drawings in which:

FIGURE 1 is a perspective view of the dispensing device,

FIGURE 2 is a view of the device on a smaller scale seen as applied to the lid of a garbage receptacle such lid being shown in central cross section, FIGURE 3 is an enlarged central cross sectional view of the neck portion and dispensing means of the device, FIGURE 4 is a central cross sectional view of the base of the container of the device, and FIGURES 5, 6, 7 and 8 are diagrammatic views showing in central cross section alternative arrangements of ledges which could be used in the dispensing device.

Referring firstly to FIGURES 1 to 4 the dispensing container therein shown has a body part 10 provided with a neck portion 11 fitted with an outlet tube 12 having an outlet nozzle 13. To the neck 11 there is fitted a closure cap 14 which has an inturned rim portion 15 co-operating with an out-turned lip 16 on the neck 11 to retain the cap 14 thereon. The rim 15 of the cap can ride over a circumferential bead 17 formed around the neck 11 to snap over into a closed position wherein a central tapered plug part 18 on the closed end of the cap 14 is held engaged within the outlet nozzle 13. When the cap 14 is lowered to the position shown in FIGURE 3 a circumferential series of openings 19 in the cylindrical side wall of the cap are in communication with the open outlet nozzle 13.

The container body 10 is charged with powdered disinfectant and/or deodorising material so that when the cap 14 is lowered as just described some of the powdered material can escape from the outlet nozzle 13 until a small pile of the material becomes accumulated in a conical heap as indicated by the chain lines 20 in FIGURE 3. This blocks any further discharge of material from the outlet nozzle 13 until mechanical disturbance allows the accompanying material at 20 to become dispersed. This will occur if the container is tilted sideways allowing the material accumulated on the ledge formed by the end wall 21 of the cap 14 to drop laterally through the apertures 19. When the container is again in vertical inverted attitude further material will collect on the interior of the wall 21 of the cap 14 until the outlet nozzle 13 is again clogged to prevent further discharge.

FIGURE 2 shows the device in use on the lid 22 of a garbage container the top part of which is shown at 23. It will be seen that the base of the container 10 is secured centrally to the inside of the lid 22 so that when the lid is on the garbage container 23 the device is in vertical inverted attitude. When the lid is raised as shown in FIGURE 2 for access to the garbage container 23 the body of the device becomes tilted as shown and allows the escape of the powdered material through the apertures 19 in the cap 14 and replacement of the lid 22 returns the disinfectant and/or deodorising dispensing device to its vertical inverted attitude in which a fresh quantity of the powder will accumulate at 20 to clog the outlet 13. The device thus acts as an automatic sprinkler for supplying powdered disinfectant and/or deodorising material to the interior of a garbage or similar container whenever the lid is removed for access thereto, the sprinkler outlet being re-charged when the lid is returned to the garbage container.

The body 10 of the dispensing device may be arranged so that it can be attached to the underside of a lid such as 22 in various alternative ways. For instance tacky adhesive may be applied to the bottom face of the container to effect its attachment to the place of use or alternatively suction pads or other removable attaching means may be employed.

FIGURE 4 shows at 24 the bottom wall of the container (which is uppermost in the inverted attitude) and it is coated with a layer of tacky adhesive indicated at 25. The adhesive 25 is before use covered by a protective layer such as a disc of silicone impregnated paper indicated at 26 the edges of which indicated at 27 project beyond the adhesive layer and may be curled slightly upwardly towards the sides of the container body 10. Just before use the paper disc 26 is stripped off to expose the adhesive for attachment of the device.

The body of the container, its neck 11, outlet tube 12 and its cap 14 may advantageously be formed of molded plastic of a kind possessing some resilience permitting the rim 15 of the cap to snap readily over the bead 17 of the neck and in addition enable the plug portion 18 of the cap to have a reasonably close fit in the outlet nozzle 13.

A removable lid of a garbage receptacle when lifted off is invariably tilted to some extent and may then be rested on its side or upside down or right way up on the ground. With the container fixed to the inside of the lid approximately in the centre thereof as shown in FIGURE 2 sprinkling of the powder from the dispensing device into the garbage receptacle will occur as soon as the lid is raised and may be caused to cease when the lid is rested in any of the attitudes mentioned. Matters may also be so arranged that accumulation of the powder in the cap will again tend to occur when the lid is replaced on the receptacle so as to be ready to be sprinkled when the lid is again raised. To provide for this manner of control it will generally be advantageous to have the outlet nozzle 13 supplied with the powdered material from the container through a spiral or helical passage having at least one turn. The passage will be so arranged that a discharge from the container body 10 through the nozzle outlet 13 is prevented from continuing indefinitely in any single attitude even under exceptional circumstances such as when a garbage bin lid becomes blown about by wind.

FIGURES 5 to 8 show diagrammatically various alternative shapes of ledges that can be used in place of the end wall 21 of the cap 14. In FIG. 5 there is shown a ledge 28 of conical form with its apex pointing downwardly while FIG. 6 shows a conical ledge 29 having its apex poining upwardly. These are shown as co-operating with an outlet nozzle 30 corresponding to the nozzle 13. Further FIGS. 7 and 8 show respectively a concave ledge 31 and a convex ledge 32 presented towards the nozzle 30. The parts are arranged so that to suit each particular case the appropriate degree of displacement of the cap from the nozzle 30 occurs to enable a small amount of powder to accumulate on the ledge 28, 29, 31 or 32 and in so doing to clog the orifice 30 to prevent further escape of powder.

For use with a receptacle having a hinged lid the tilting of the lid upwardly may cause powder to spill over the edge of the cap of a dispensing device and preferably in this case the cap has a side lip on which in the tilted position powder can accumulate to clog further ingress of powder from the container. The container in this case could have its cap forming a permanent closure around three sides of the orifice and being capable of opening an outlet on the fourth side and being formed with a ledge thereat. This fourth side would be lowermost when the container is fitted to a lid and the lid is canted upwardly about its hinge. In such form of construction the cap could be formed integrally with the neck portion of a container and be fitted with a separate closure which is completely removable.

What is cleam is:

1. A disinfectant and deodorant dispensing device for garbage receptacles having a moveable lid, comprising a container for said disinfectant and deodorant attachable to said garbage receptacle lid and having a neck portion, means mounted on said container neck portion providing a ledge across said neck portion and an outlet nozzle on said ledge, a closure cap slideably mounted on said container neck portion extending across said outlet nozzle for being moved toward and away from said outlet nozzle for opening and closing said outlet nozzle, and said closure cap having a series of side openings.

2. A disinfectant and deodorant dispensing device for garbage receptacles having a moveable lid, comprising a container having a bottom at one end and a neck extending from its opposite end, a cylindrical cap slideably mounted on said container neck and a head outlet nozzle, a cylindrical closure cap having an annular wall slideably mounted on said container neck and a head extending across said outlet nozzle for opening and closing said outlet nozzle upon the sliding of said closure cap on said container neck, said closure cap side wall having a series of openings positioned for being opened and closed by said container neck upon said sliding of said closure cap on said container neck and means for attaching said container bottom to the lid of said garbage receptacle.

3. A disinfectant and deodorant dispensing device as claimed in claim 2 wherein said closure cap head has a plug positioned for being inserted in said outlet nozzle upon the sliding of said closure cap towards said outlet nozzle for closing the same.

References Cited by the Examiner
UNITED STATES PATENTS

| 1,495,683 | 5/24 | Gates | 222—457 X |
| 1,958,431 | 5/34 | Hartog | 222—499 |
| 2,571,428 | 10/51 | Drinkhaus | 222—457 X |
| 2,689,066 | 9/54 | Budnik | 222—181 X |
| 2,877,918 | 3/59 | Gardner | 222—522 X |
| 3,096,913 | 7/63 | Corley | 222—181 X |

FOREIGN PATENTS 168,122 10/56 Australia.

LOUIS J. DEMBO, *Primary Examiner.*